United States Patent [19]

Maher

[11] 4,005,040

[45] Jan. 25, 1977

[54] FOAMED AND SOLID RUBBER-STARCH GRAFT COPOLYMER COMPOSITIONS AND METHOD OF PREPARATION

[75] Inventor: George G. Maher, Dunlap, Ill.

[73] Assignee: The United States of America as represented by the Secretary of Agriculture, Washington, D.C.

[22] Filed: Nov. 10, 1975

[21] Appl. No.: 630,373

[52] U.S. Cl. ............... 260/17.4 GC; 260/17.4 BB; 260/742

[51] Int. Cl.² ....................... C08L 3/06; C08L 7/02

[58] Field of Search ............ 260/17.4 GC, 17.4 ST, 260/17.4 BB

[56] References Cited

UNITED STATES PATENTS 3,359,224  12/1967  Fassinger et al. ................. 260/17.4
3,673,136  6/1972  Buchanan et al. ................. 260/17.4
3,730,829  5/1973  Maher ............................... 260/17.4

*Primary Examiner*—Edward M. Woodberry
*Attorney, Agent, or Firm*—M. Howard Silverstein; David G. McConnell

[57] ABSTRACT

Starch graft copolymers are prepared in aqueous media by reacting soluble sodium starch xanthate with a polymerizable vinyl monomer and hydrogen peroxide. Foamed rubbers reinforced with starch graft copolymers are prepared, without the need for mechanical frothing, by conducting the starch graft polymerization reaction in the latex emulsion. Nonfoamed rubber compositions are prepared in a similar manner.

32 Claims, No Drawings

FOAMED AND SOLID RUBBER-STARCH GRAFT COPOLYMER COMPOSITIONS AND METHOD OF PREPARATION

BACKGROUND OF THE INVENTION

The invention relates to a method of preparing starch graft copolymers and to the starch graft polymer composition prepared thereby. It further relates to starch graft copolymer reinforced solid and foamed rubber products and to their method of preparation.

Starch graft copolymers have been prepared by many methods, most of which involve the initiation of free radicals on the starch backbone molecule and the subsequent polymerization of a monomeric compound thereon (*Block and Graft Copolymerization*, Vol. 1, R. J. Ceresa, ed., John Wiley and Sons, 1973, Chapters 1 and 2). Other methods are ionic in reaction mechanics and include the reaction of a monomer with a starch containing a suitable functional group (usually an alkali metal alkoxide derivative of starch is used) and the reaction of a preformed reactive polymeric material with a suitable functional group derivative of starch. An example of this last method and its usefulness lies in our recent disclosures on the reaction of polyethyleneimine (PEI) with starch xanthate (SX) [Maher et al., Staerke 19: 354 (1967)]. The coprecipitation of the PEI and SX combination with rubber latices resulted in a solid rubber product having enhanced physical properties [Douglas et al., J. Appl. Polym. Sci. 16: 1937 (1972).].

Background of the Graft Copolymer Formation

Dimov and Pavlov [J. Polym. Sci. 7: 2775 (1969)] teach that insoluble cellulose xanthate (CX), acrylonitrile (AN), and hydrogen peroxide react in a highly acid aqueous medium to form a cellulose-polyacrylonitrile graft copolymer ostensibly with complete elimination of sulfur from the parent cellulose molecule, a graft carbon atom being linked to the cellulose oxygen atom that was involved in the xanthate group. Dimov and Pavlov also teach that the percent of grafted AN (over a 12.5-hour reaction period) is at a maximum (56–60% of the An added) at pH of from 2 to 4 and decreases at higher pH levels. Yet in subsequent report on the same subject and reaction [Papier 23: 809 (1969)] they state that maximum AN combines with CX when the aqueous medium pH is 9 and the medium contains 15% EtOH. Also, in addition to graft polymerization, they state that at alkaline pH cyanoethylation of the xanthate group and free hydroxyl groups still in the cellulose can occur, but at pH 6 — 7 cyanoethylations are the main reactions, and at pH below 6 cyanoethylation of the xanthate group is the main reaction. These situations on the insoluble CX reaction would imply a remaining sulfur content in the products of the AN reaction and contradict their first findings. The dilemma is no doubt due to the heterogeneous nature of their reaction — heterogeneous in the insolubility of the CX substrate in the aqueous or ethanolic media, and heterogeneous in the nature of the cellulose itself over the wide range of pH involved, a fact known to those practiced in the field of interest. Gruber et al. [Staerke 24: 251 (1972)] in a paper concerning the grafting of an insoluble starch xanthate by the method of Faessinger and Conte, and Fanta et al. [Staerke 25: 157 (1973)π in work concerning the grafting of insoluble starch by a ceric ion initiation polymerization of AN, substantiate the heterogeneous nature of the insoluble starch xanthate-AN graft polymer through morphological studies of the granular product and show the grafting accomplishment involves mainly only surface layers of the starch molecules, not interior layers. Also, Gruber et al. point out that the product has no determinable sulfur content and propose a fourth possible linkage of graft to starch; namely, a direct graft carbon atom link to a starch carbon atom.

The problems of the uncertain sulfur content and the unlucid reaction mechanism ae actual dictates of the FaessingerConte methodology. Thus, the entire gamut of Faesssinger-Conte patents concern the use of a water-insoluble substrate for thionation to get a water-insoluble sulfur derivative that is used to form a water-insoluble graft copolymer (Belgian Patent 646,284, Oct. 8, 1964 — British Patent 1,059,641, Feb. 1967 — U.S. Pat. No. 3,330,787 — German Patent 1,468,965, 1969 — on wood pulp; U.S. Pat. No. 3,340,326 — on nylon; U.S. Pat. No. 3,357,933 — on polyvinylalcohol and substituted cellulose; U.s. Pat. No. 3,359,222 — on wool). Even in the last patent issued (U.S. Pat. No. 3,359,224), which culminates with the use of cellulose and starch, the insolubility status is stressed. In regard to starch, this patent employs such strong language as "herein a substantially water-insoluble, cellulosic or amylaceous monothiocarbonate or dithiocarbonate polymeric substrate as defined herein is reacted ", "substantially water-insoluble means a substrate whose solubility, in the form in which it is employed, in water at 30° c. or less does not exceed about 10 percent of its weight," "both it (the thionated substrate) and the polymeric substance from which it is formed must also be substantially alkaline insoluble, at least at the alkaline pH used to form the substrate and to graft polymerize," "amylaceous covers both the amylose and amylopectic entities and the various starches, e.g., potato, wheat, corn, rice and tapioca starches in their nonsolubilized, i.e., unpasted, forms," "the thioated substrate, when graft polymerized with the monomer, must be substantially free from any water-soluble by-product of the thioate formation," and "because the amylosic substrates can readily become solubilized, precautions must be taken to be certain the substrate does not become solubilized during or after thioate formation or during graft polyermization." Thus, it is no wonder that Faessinger and Conte are forced to state "thiocarbonation is of a relative low order, i.e., substrates are produced having thioate sulfur contents of the order of 0.5 percent and usually 0.3 percent or less; this low thiocarbonation is, of course, vital when it is possible to produce a water-soluble thioated substrate, e.g., from cellulose."

Advantage and Character of Instant Graft Copolymerization

The experienced research worker and practitioner schooled in the art and science then will recognize why the other workers cited had such difficulty in finding sulfur in their products and using analytical results to set forth a meaningful reaction mechanism and structure for graft copolymer. These detriments to grafting do not exist in my discovered method with highly soluble starch xanthate (SX). My process imposes no limitations on the solubility of substrate being grafted and hence opens a utility for many substrate types not heretofor deemed applicable, e.g., dextrins, pectins, hemicelluloses, etc. In my method all materials are soluble, except for the graft copolymer and perhaps some monomer reactants and some homopolymer formed. Compared to the prior art of grafting methodology my method has no need of inorganic acids and initiators (as cerium or iron ions), irradiation initiation, or organic solvents for reaction media, all of which may bring additional process steps. Also the worker and practitioner will recognize the several differences in the reaction conditions imparted in the many examples of the cited authors and those of the intant inventor. Thus, I have let the temperature of the grafting reaction go uncontrolled and have let the pH also go uncontrolled from its initial high point, 11, whereas the previous workers have kept the reaction temperature at room conditions (25°–27° C. or slightly higher) and the pH at a constant level that may be as high as 8 but is preferably on the acid side between 1 and 5.

As a result I have been able to discover that with a proper relationship between the degree of substitution of the soluble SX, the amount of SX, the amount of hydrogen peroxide, and the amount of vinyl monomer there is a great generation of heat during the grafting, a considerable amount of a strong acid is formed and the pH is dropped to about 3 or less, a gas is formed and evolved, and a very uniform gelation of the reaction mixture occurs. The totally unexpected simultaneous occurrence and blending together of these phenomena in a reaction period of from 1 to 18 hours is of extreme importance and will be emphasized again in application, being in fact the complimenting key to lock the graft copolymer into incorporation with rubber. Further the uniform gel, which has developed a viscosity of 20,000 to >100,000 cp. in 1–3 hours depending on reaction variables and may be heavily opaque due to extremely fine and evenly dispersed particles of graft copolymer, does, upon treatment with alcohol and ether, yield a very fine dry powder of graft copolymer.

Weight yields of solubility tests (in dimethylformamide and dimethylsulfoxide) on the powder products indicate formation of a very high degree of graft copolymer and very little unattached homopolymer, in fact less than several percent of the monomer added is in homopolymer. Infrared spectroscopic absorption studies substantiate the graft copolymer status of the products.

My work firmly establishes the presence of sulfur in the graft copolymer; and in a paper published after my discovery, Ehrnrooth [J. Polym. Sci. C42: 1569 (1973)] has verified with cellulose, noting a 0.3–1.0% sulfur content in the graft made in a modified Faessinger-Conte method and also a pH drop during the CX grafting. As I, Ehrnroth establishes that few xanthate groups remain in the graft, but no carbon disulfide is evolved during grafting; yet she has no expressed thought of the inter-relationships of xanthate group disappearance or survival, acid formation, and degassing. Ny discoveries and observations lead to a postulation that the reactions, upon using the proper amounts of ingredients, can be expressed by the equation:

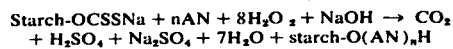

Thusly formed gel and solid form graft copolymers have utility as thickening agents, water absorbers, ion absorbers, settling agents, soil conditioners, and paper additives, as well as the rubber additive use of the instant invention and other uses known to those skilled in the art. The presence of sulfur containing functional groups broadens the areas of possible applications.

Background of Reinforced Foam and Solid Rubber Formation

Current practice in manufacture of foam rubber is to prepare the latex mixture containing all the agents to be added except for the gas that is to produce the froth or foam structure and the agent that is to gel the structure to its permanent cellular condition. The mixture is then beaten in a suitable chamber with air to make the froth or chemicals (one of which may indeed be hydrogen peroxide) are added whose reactions will form a gas to do the frothing. Next the froth is passed to a mold or other shaper where another gas or chemicals are added to gel the foam structure (i.e., coagulate the rubber into a continuous structure) by counteracting any agents that have been added initially to let the latex particles remain free for maneuverability into the foam. Finally the mold is degassed prior to its being heated or it is allowed to set at ambient room temperatures to cure. Foam rubber processes have been put into one of three named classes—the Kaysam or heat-gelling, the Dunlop or room temperature gelling, and the Talalay or vacuum-freezing method. In the first, an ammonium salt (that will release free ammonia gas and leave an acid residue) and zinc oxide are added to a thin layer of froth and moved on a casting band to a heating oven. In the second, sodium silicofluoride and zinc oxide are added for a slow cure of casts of thicker dimensions. In the last, after evacuating, carbon dioxide gas is added and the curing is done by heating. These generalities are well known to those practiced in the art (Encylopedia of Polymer Science and Technology, Vol. 8, page 169, N. M. Bikales, ed., Interscience Publishers, New York, 1968).

Less known is the fact that reinforcing agents often are not inncorporated in foam rubber. Nevertheless, starch has been so added. Thus the load supporting capacity of sponge rubber was increased by impregnating the sponge with 0.1–10% of starch and 10–40% of alkali metal hydroxide from an aqueous solution that was 25–200% by weight of the dry weight of the sponge (U.S. Pat. No. 2,711,977). Therein the alkali represents the chief additive by weight. A resilient foam rubber was made by putting granular starch particles, 1–8% by weight, into the latex before foaming and then gelatinizing the starch by heating the foam (Everett, British Patent 816,853, July 22, 1959; U.S. Pat. No. 2,945,826; German Patent 1,266,964). The product was said to have intercommunicating cells and increased resistance to compression. Another patent provides that starch derivatives of the ester or ether type may be added to latex before foaming, during foaming, or after foaming and then gelatinized before gelling, or the derivatives may be gelatinized prior to addition to the latex, either method providing a final product of increased load bearing capacity (U.S. Pat. No. 3,107,225). One to 20 parts of starch per 100 parts of rubber were thus introduced. In these above processes one knowledgable in the arts and practices will recognize the several operational steps of the overall processes.

U.S. Pat. No. 3,542,708 concerning the incorporation of a SX:PEI reaction product into solid compounded rubbers as a reinforcing agent can be regarded as a description of a method of using a starch graft copolymer as a rubber additive. It is an object of this invention to provide a useful and superior method of accomplishing the grafting of SX. It is further an object to provide foamed or solid rubber products containing such starch graft materials.

In accordance with the above objects, I have discovered a method of preparing starch graft copolymers comprising the following steps:

a. Preparing an aqueous solution of an alkali metal salt of starch xanthate having a xanthate degree of substitution of from 0.05 to 3, the aqueous solution having a pH of about 11.

b. Reacting in the aqueous solution hydrogen peroxide and a vinyl monomer with the starch xanthate to form a gel of starch graft copolymer. The starch xanthate, hydrogen peroxide, and vinyl polymer are present in amounts such that the pH in the resulting reaction media drops to a value of from about 2 to 7.

c. Recovering the starch graft copolymer.

I have also discovered that the above soluble starch xanthate grafting reaction occurs in the presence of rubber latices with the result that more gas is evolved, more heat is generated, less pH drop occurs. The extent of change varies with the type of latex rubber used. The amounts of starch xanthate, vinyl monomer, hydrogen peroxides, and rubber latex are such that the pH drops to a point below the gel point of the latex (i.e., pH about 3 to 8). If the reaction mixture is not stirred, the resulting product is a foamed rubber, but if the reaction mixture is stirred during the reaction, foamed coagulum formation is prevented and solid rubber compositions are formed.

An obvious advantage of my method of foam rubber production, beyond the strength enhancements of the foam, lies in the elimination of the beating and mechanical frothing steps and the machinery needed therefor as used in practiced technology. With my method predetermined appropriate amounts of ingredients can be charged and mixed into molds as single loads for rapid line production with minimum waste. As the foaming and coagulation proceed so rapidly and a skin forms on an exposed surface, a continuous sheet casting operation would be very feasible. The high temperatures reached in the foaming process, 80°–90° C., may well induce vulcanization and curing, but more can be provided easily if needed.

The foam rubber products are suitable for use in the general areas of foam rubber applications, except in areas where extreme lightness in weight or fineness in the structure of the cellular system might be a factor, or where the higher starch contents could cause a problem under high moisture environments. Most particularly the instant products are suitable for poured-in-place foams as moldings, spacers, etc. where drainage is possible to remove aqueous media after gelling. Once thickening has set in, the mixtures can be put on a screen-type or grid supporter. The casting thickness can be quite variable and can vary from a fraction of an inch, as may be desired in thin layers for composite fabrics or carpets, to several inches as may be desired in pads or sound or heat insulations. They can serve as shock absorbers or vibration dampers, and in this regard as supportive or restraining media if loads are not excessive. As compression set character is not good, they would seem best suited under conditions which would apply the load as a stretch. Compression shock absorbers which need not return completely to their previous state is an obvious application and shaping and cavitating could improve the compression set properties in application.

DETAILED DESCRIPTION OF THE INVENTION

My process of graft copolymer formation is very simple. It starts with a water-soluble xanthate of a polysaccharide preferably the sodium salt of SX having a xanthate degree of substitution (DS) of from 0.05 to 3. This SX can be cheaply and readily prepared as ca. 8–12% aqueous solution from starch of varied plant source by one of several published methods—a batch process [Lancaster et al., Ind. Eng. Chem., Prod. Res. Develop. 5: 354 (1966)], a continuous "Roto-Feed" process (ibid), or a continuous "Ko-Kneader" process [Doane et al., Staerke 17: 77 (1965) and Swanson et al., Ind. Eng. Chem., Prod. Res. Develop. 3: 22 (1964)]. The xanthate of known D.S. is dissolved in additional water to make an approximately 2–4% by weight solids concentration. Then a vinyl monomer and hydrogen peroxide are introduced and quickly mixed intimately with the SX solution. The mixture is permitted to stand at room temperature for 0.5–18 hours in a vessel large enough to contain the foamed gel that is generated. After reaction, the product solids are isolated by drowning the gel in an organic solvent in which water, inorganic byproducts, and undesired nonpolymeric organic substances, including unreacted monomer, are soluble. Then the solids are washed appropriately and dried. Of course, if a comtemplated use permits, reaction product solids need not be isolated in this manner and the product mixture can be left in its aqueous gel state and acid pH.

Several classes of polymerizable vinyl compound (i.e., vinyl monomers) are suitable for use in accordance with the invention, including the following:

| | | |
|---|---|---|
| Acids: | acrylic acid | α-methylcrotonic acid |
| | cinnamic acid | vinylacetic acid |
| | crotonic acid | vinylacrylic acid |
| | dimethylacrylic acid | vinylglycolic acid |
| | itaconic acid | |
| Alcohols: | allyl alcohol | methallyl alcohol |
| | cinnamic alcohol | vinyl alcohol (acetaldehyde) |
| | crotyl alcohol | |
| Aldehydes: | acrolein | crotonic aldehydes |
| | cinnamic aldehyde | dimethyl acrolein |
| Amides: | acrylamide | N-vinyl-N-ethylacetamide |
| | cinnamic amide | N-vinyl-N-methylacetamide |
| | crotonic amide | N-vinyl-2-pyrollidone |
| | N-(dimethyl-3-oxobutyl)acrylamide | |
| | N-methylolacrylamide | |
| Amines: | B-(N,N-diethylamino)ethyl methacrylate | |
| | ethylenimine (vinyl amine) | |
| | 2-hydroxy-3-methacryloyloxypropyltrimethyl- | |
| | ammonium chloride | |
| | N-methylbenzylidenimine | |
| | N,N,N-trimethylaminoethylmethacrylate methyl | |
| | sulfate | |
| | vinyl pyridine | |
| Ester: | allyl acetate | methyl methacrylate |
| | allyl citraconate | methyl vinylacetate |
| | allyl phthalate | vinyl acetate |
| | methyl acrylate | vinylene carbonate |
| Ethers: | divinyl ether | methyl methylvinyl ether |
| | ethyl vinyl ether | |
| Halides: | allyl chloride | vinyl bromide |
| | chloroprene | vinyl chloride |
| Hydro-carbons: | butadiene | propylene |
| | isoprene | styrene |
| Ketones: | cinnamyl methyl ketone | methyl vinyl ketone |
| | ethylidene acetone | |
| Nitriles: | acrylonitrile | crotonic nitrile |
| | allyl cyanide | methacrylonitrile |

| | -continued |
|---|---|
| Phenols: | vinyl phenol |

Table 1 summarizes typical data on graft formation and characterization using AN monomer. The sulfur content of the products is an equivalent range of 17–57% of the original xanthate groups, depending on the original D.S. and the AN-hydrogen peroxide relationship used. Actually the sulfur remaining in the graft copolymer may be in the form of xanthate groups that are substituted by acrylonitrile chains or may be in the form of xanthide groups that crosslink starch molecule chains. The crosslinks thus formed by the oxidative action of hydrogen peroxide could account for the gelation observed. A small degree of hydrolysis of xanthate groups by acid formed could account for the slight sulfide odor noted in some reactions. Any free carbon disulfied would be oxidized to sulfate by hydrogen peroxide. Some gas formation may stem from the decomposition of hydrogen peroxide in alkaline solution to give oxygen, but that reaction decreases with decreasing pH.

When rubber foams or solids are made, the amount of 8–12% aqueous SX preparation needed to give the ratio of starch to elastomer solids desired is mixed into the appropriate volume of latex to form a smooth, creamy, stable emulsion. An amount of starch xanthate which contains from about 0.001 to about 0.04 moles of xanthate groups per 100 g. of latex solid is preferred. Suitable latices include SBR 2105, NBR 236, NBR N-251, Polyisoprene 700, Polychloroprene 571, and Natural Rubber. The International Institute of Synthetic Rubber Producers, Inc. has established and published detailed specifications describing these latices (1968 Book of ASTM Standards, Part 28, pp. 1144–1169, American Society for Testing and Materials, Philadelphia, Pa., 1968). Then a mixture of the vinyl monomer and the hydrogen peroxide is added as quickly as possible and mixed as quickly and thoroughly as possible so that the total reaction mixture can be put in the vessel in which the rubber is to be observed or cast. As reaction progresses, a small amount of liquid exudate is formed and at the end of the reaction the gelled solid mass is easily slipped from the mold for washing with water and drying. The usually cloudy exudate can be saved for recycling. The preferred amounts of vinyl monomer and hydrogen peroxide are about 0.1 to 1.0 moles per 100 g. latex solids. The greatly expanded foams or compact rubber coagulants readily set upon standing at room temperatures with little shrinkage, were readily cleaned in water, and dried in open air drafts. While the polymerization of added vinyl monomers is sometimes somewhat less when the reaction is done in latex, running 7–85% of the added vinyl monomer and depending perhaps on the particular latex used, the percent recovery of solids for the compositions of elastomer and graft copolymer indicated is 90–96%. The cream to light tan colored dry foams do not appreciably shrink, shrivel, or disfigure, are more or less odorless, and have a spongelike appearance, being more open-celled than close-celled. Physical testing of foam specimens show there is a good enhancement of tensile strength characteristics, percent elongation is good, and percent tension set is acceptable. They pass the static fatigue test. Compression set values, however, are not particularly good compared to what one might like in a general type of foam rubber.

There are a number of parameters and variables, some already discussed, and others that ones experienced in the arts can discern in the examples given, which can be manipulated to some degree according to what one desires as outcome. Thus for controlling the extent of the pH drop one may regulate either the amount of soluble SX or the D.S. of the SX when a given amount of each of vinyl monomer and hydrogen peroxide are used. For example, while a given amount of each of AN and hydrogen peroxide will put more nitrogen in a graft copolymer using ca. 0.24 D.S. soluble SX as compared to ca. 0.55 D.S., an intermediate amount of nitrogen is entered with a ca. 0.14 D.S.; and yet a lesser given amount of each of an AN and hydrogen peroxide will put the larger amount of nitrogen in the graft copolymer from the lower D.S. substrate. With a given xanthate D.S. the viscosity development can be increased progressively by increasing the amount of AN used with a given amount of peroxide or by increasing the amount of peroxide used with a given amount of AN.

Starch xanthates having D.S.'s of from 0.05 to 3 are suitable for use in accordance with the invention. However, there is no sharp delineation of the D.S. range that is applicable. The upper limit is the maximum amount of xanthate that can be attached to the starch molecule. A lower limit may be indicated by the fact that while a 0.09 D.S. produces a 11,000 cp. viscosity and a drop to 4.7 pH in a 1-hour reaction, a 0.04 D.S. produces no viscosity rise and a pH drop to only 6.8–7.4 in 1 hour, in spite of manifold manipulations of AN and hydrogen peroxide amounts and ratios. Also when the reaction is done in latex, a 0.04 D.S. xanthate will promote some foaming but only a drop to ca. 8.0–8.5 and no coagulation of solids, even though the same amounts of AN and hydrogen peroxide are used as will give adequate foaming, pH <7, and good coagulation of solids from a 0.10 D.S. xanthate. Generally speaking compositions with soluble SX of around 0.5 D.S. are difficult to process and control because of the rapid reactions and heat generated therewith and the stiffness of the gels and foams. In the foam preparation the most even distribution of rather uniform, small-sized pores seems to stem from about 0.12–0.15 D.S. substrate. A 0.25 D.S. xanthate may be most preferable for compounded solid rubber formation. In preparing starch graft copolymers, a xanthate D.S. range of from 0.1 to 0.6 is preferred.

By varying the nature of the pendent functional group of the vinyl monomer that is polymerized one can change the character of the graft copolymer. Thus the use of acrylic acid, giving rise to a polyacrylic acid graft, produces a copolymer that has a water affinity and ability to take up cations. The use of acrylamide, N-substituted acrylamides, or acrylic esters substituted with amine-bearing groups can alter the basicity, etc. The foam rubbers made with styrene have a better elongation strength than those made with acrylonitrile. Acrylamide and methylacrylate impart a hard, brittle firmness to the foam rubber, but acrolein-containing foams are flexible. The vinyl monomer and peroxide need not be added as a mixture when forming graft copolymer. One or the other can be added first, but if peroxide is added first one has to be sure any time lapse does not promote too much oxidation of xanthate to xanthide. When forming rubbers it seems best to add the reactants together or the peroxide last.

Also I have found that additives can be mixed with the latices without detriment to the foam or solid, thus antioxidant such as Stalite A, accelerator such as Captax (although it is recognized that the SX itself, with its sulfur content, may act as an accelerator or vulcanizer to some extent), powdered sulfur, and zinc oxide, etc. Acid can be added to the monomerperoxide mixture prior to mixing into the latex to lower the pH in the foam rubber media and increase potential gelling and recovery of solids, but too much acid produces a fragility in the foamed solid mass. Glycerol can be added in small amounts to act as a plasticizer, especially with the higher D.s. xanthates which form a stiffer and less even foam cell structure. The gelled foams can be subjected to accelerated drying in warm air ovens with no deleterious effects on properties studied. Reagents used can be purified if necessary, but I have used the ordinary reagent grade chemicals of commerce. When graft copolymer alone is being made with grossly insoluble monomer such as styrene, an emulsifier can be added to facilitate reaction. Also glycerol has a plasticizing effect when added in the grafting step, on high D.S. substrate especially, but epoxy-type plasticizers impart hardening and brittleness.

There is available then to one practiced in the art a wide latitude of operational variables in my newly discovered method within which he can place his desire and need in results, with an overall potential of saving in procedural engineering steps and equipment. Some of these will be apparent in the following examples and others may appear when the methodology and products are explored in application. Examples 1–18 concern grafting various starch xanthates with AN; Examples 19–24, with other monomers; Examples 25–26 concern foam and solid rubber-starch xanthate graft copolymer formation from various starch xanthates and AN and NBR 236 latex; Examples 27–32 concern foam rubber production from various latices with varied starch xanthate-varied vinyl monomer grafts; Examples 33–35 concern solid rubber production from various latices and starch xanthate with AN graft; Examples 36–42 concern foam and solid rubber production from varied latex-varied starch xanthate-varied vinyl monomer compositions.

Soluble Starch Xanthate Graft Copolymerization

EXAMPLES 1–18

To 45.5 ml. of water added 15 g. of an aqueous soluble starch xanthate solution containing 9.78%, 11.70%, or 12.57% sodium starch xanthate (9.02%, 10.27%, and 9.43% starch equivalent, respectively) having D.S. of 0.14, 0.23, and 0.55, respectively. Stirred well to form a complete, orange-colored solution, pH 11–12. Mixed a volume of acrylonitrile chosen from the amounts 1, 2.5, 5, and 7 ml. (5 ml. weight 3.985 g.) with a volume of 30% hydrogen peroxide chosen from the amounts 2.5, 7, and 21 ml. and poured the mixture into the xanthate solution, stirring the concoction rapidly and well. The orange color began to fade immediately and in a few minutes the reaction mixture became vary exothermic and evolved fine gas bubbles. In 5–30 minutes the mixture developed white turbidity and began to gel. After 1 hour, the mixture had a faint, mixed odor of sulfide and nitrile and its viscosity was 19,000 cp. (measured in the reaction vessel with a Model LVF Brookfield Viscometer using a No. 4 spindle at 6 r.p.m., Brookfield Engineering Laboratories, Inc., Stoughton, Mass.). The pH was slightly acidic. After 18 hours, the mixture was a white, heavily opaque, stiff gel with a notable sulfide odor and a small amount of exuded liquid, pH 3.1. The gel viscosity was 45,000 cp.

The gel was beaten gently in 200 ml. of 95% ethanol in a Waring blendor for a few minutes to form a fine suspension that was allowed to settle overnight. The supernatant was decanted and the solids were washed in 50 ml. centrifuge tubes, stirring over a 1-hour period and then centrifuging. This washing was done three times with 95% ethanol. Then the solids were set overnight in absolute ethanol and next washed three times similarly with ethyl ether. The washed solids were dried to constant weight in a vacuum desiccator over $P_2O_5$ at room temperature. The isolation, washing, and drying process can be accelerated of course, my described actions being only a matter of particular convenience in time. The dry products were analyzed for nitrogen content (N) by standard micro-Kjeldahl procedure and for sulfur (S) by White's method [Mickrochim. Acta 807 (1962)]. The infrared absorption spectrum was obtained on a Nujol mull in a sodium chloride cell with a Perkin-Elmer Model 137 Infracord spectrophotometer. The dry 60 mesh powder was insoluble in either dimethyl sulfoxide or dimethylformamide, at room temperature for a week or 100° C. for 15 minutes, testing 0.05 g. per 5 ml.

Results of tests are found in Table 1.

TABLE 1

| | Reaction mixture ingredients Initial | | | | | | Analyses of starch graft copolymer product, 18 hr. | | | |
|---|---|---|---|---|---|---|---|---|---|---|
| | | Starch | | | Viscosity | | | Calculated for graft composition | | |
| Example No. | Xanthate D.S. | equivalent g. | AN g. | $H_2O_2$ g. | at 1 hr. cps. | pH at 18 hr. | Found, % elements | Elements % | Xanthate D.S. | % Added AN |
| 1 | 0.14 | 1.353 | 3.985 | 2.1 | 19,000 | 3.1 | 14.96, N 1.37, S | 14.95, N 1.32, S | 0.08 | 46 |
| 2 | | | 3.985 | 0.75 | 30,000 | | 17.04, N 1.02, S | 17.06, N 1.08, S | 0.08 | 64 |
| 3 | | | 3.985 | 6.3 | 32,000 | | | | | |
| 4 | | | 0.797 | 2.1 | 2,500 | 3.1 | | | | |
| 5 | | | 1.992 | 2.1 | 3,500 | 3.1 | | | | |
| 6 | | | 5.978 | 2.1 | 58,500 | 3.1 | 15.04, N 0.63, S | 15.04, N 0.66, S | 0.04 | 31 |
| 7 | 0.23 | 1.541 | 3.985 | 0.75 | 9,500 | 2.5 | 15.34, N 1.44, S | 15.35, N 1.43, S | 0.09 | 56 |
| 8 | | | 3.985 | 2.1 | 20,000 | 2.2 | 17.07, N | 17.01, N | 0.09 | 73 |

TABLE 1-continued

| | Reaction mixture ingredients Initial | | | | Viscosity | | Analyses of starch graft copolymer product, 18 hr. | | | |
|---|---|---|---|---|---|---|---|---|---|---|
| | Starch | | | | | | | Calculated for graft composition | | |
| Example No. | Xanthate D.S. | equivalent g. | AN g. | $H_2O_2$ g. | at 1 hr. cps. | pH at 18 hr. | Found, % elements | Elements % | Xanthate D.S. | % Added AN |
| 9 | | | 3.985 | 6.3 | 35,000 | 2.0 | 1.22, S<br>16.77, N<br>1.08, S | 1.21, S<br>16.70, N<br>1.12, S | 0.08 | 69 |
| 10 | | | 0.797 | 2.1 | 4,000 | 2.2 | | | | |
| 11 | | | 1.992 | 2.1 | 2,000 | 2.2 | 14.62, N<br>0.73, S | 14.62, N<br>0.69, S | 0.04 | 98 |
| 12 | | | 5.978 | 2.1 | 15,500 | 2.2 | 17.32, N<br>1.14, S | 17.41, N<br>1.16, S | 0.09 | 52 |
| 13 | 0.55 | 1.415 | 3.985 | 0.75 | 22,000 | 2.4 | | | | |
| 14 | | | 3.985 | 2.1 | 65,000 | 2.1 | 13.67, N<br>4.13, S | 13.61, N<br>4.13, S | 0.24 | 42 |
| 15 | | | 3.985 | 6.3 | 45,000 | 1.7 | 14.36, N<br>3.68, S | 14.37, N<br>3.73, S | 0.23 | 47 |
| 16 | | | 0.797 | 2.1 | 3,000 | 2.1 | | | | |
| 17 | | | 1.992 | 2.1 | 14,000 | 2.1 | | | | |
| 18 | | | 5.978 | 2.1 | 31,000 | 2.1 | 13.83, N<br>2.14, S | 13.71, N<br>2.15, S | 0.12 | 27 |

EXAMPLE 19

To 25 ml. of water added 2.50 g. of acrylamide and stirred well to dissolve. Added 7.5 g. of an aqueous soluble starch xanthate solution containing 11.84% sodium starch xanthate (10.58% starch equivalent) of 0.20 D.S. Mixed well. Added 7 ml. of 30% hydrogen peroxide, stirring well and rapidly. The color faded and heating and degassing started in several minutes. White, opaque gel formation began after about 5 minutes and at 30 minutes the viscosity was 35,000 cp. However, the gel was not stiff, but was flowable. After 18 hours, the opaque gel was still flowable. The material was processed through the ethanol isolation and washing method of Example 1, this being somewhat tedious as the solids tended to form hard, difficult to triturate lumps. The final, dry product was analyzed for carbon, hydrogen, and nitrogen—found 46.89% C, 7.44% H, and 12.99% N; corresponding to 46.97% C, 7.40% H, and 13.03% N in a starch:polyacrylamide copolymer represented by 5 mols of acrylamide and 2 mols of water per anhydroglucose unit stemming from grafting of 69.5% of the added acrylamide and complete elimination of xanthate groups.

EXAMPLE 20

To 25 ml. of water added 2.66 g. of acrylic acid, stirring well to mix evenly, and then proceeded as in Example 19. Color disappearance and degassing began immediately, but heat generation apparent to the touch did not occur. Opaqueness and gelation set in as before and in 30 minutes the gel was nonflowing with viscosity above 100,000 cp. After 18 hours, the gel was worked up as in Example 1, but with ease as precipitated particles were fine. The dry powder was analyzed for carbon, hydrogen, and sulfur—found 43.85% C, 5.53% H, and 0.00% S; corresponding to 43.95% C, 5.58% H, and 0.00% S in a starch-polyacrylic acid copolymer represented by 3 mols acrylic acid, 1 mol sodium acrylate, and 9 mols of water per anhydroglucose unit stemming from grafting of 50% of the added acrylic acid and complete elimination of xanthate groups.

EXAMPLE 21

To 50 ml. of water added 15 g. of an aqueous soluble starch xanthate solution containing 11.66% sodium starch xanthate (11.00% starch equivalent) of 0.10 D.S. Mixed well. Then rapidly stirred in a mixture of 7 ml. of 30% hydrogen peroxide and 6.28 g. of methyl acrylate. Degassing was slight and color disappearance and warming was a bit more gradual than in cases with acrylonitrile. However, in 5 minutes the mixture was gelling and becoming heavily white-opaque. The viscosity at 1 hour was 22,000 cp. After 18 hours the pH was 3.9.

EXAMPLE 22

To 50 ml. of water added 15 g. of the soluble starch xanthate solution of Example 21. stirred well. Then quickly stirred in a mixture of 4.21 g. of acrolein and 7 ml. of 30% hydrogen peroxide. The color disappearance, degassing, and warming was nearly instantaneous. The gas formation and heating in the first few minutes were the most profuse observed with any of the vinyl monomers tested, yet the gas bubbles had difficulty escaping as gel formation was also quick. After 1 hour, the viscosity was only 2,500 cp. and the mix was a compromise between translucency and opaqueness with small (<1 mm. diam.) particles of solid or globular nature dispersed throughout. The pH was 4.3. These characteristics prevailed over 18 hours, with the pH falling to 3.0 and the viscosity rising to 12,000 cp.

EXAMPLE 23

Prepared a number of solutions of 15 g. of an aqueous soluble starch xanthate solution, using 9.41% sodium starch xanthate (8.58% starch equivalent) of 0.16 D.S., in 50 ml. of water. To individual solution thus prepared then added one of the following pairs of styrene and 30% hydrogen peroxide reagents, adding the styrene first—(1) 2.71 g. and 3 ml., (2) 2.71 g. and 5 ml., (3) 2.71 g. and 7 ml., (4) 4.52 g. and 3 ml., (5) 4.52 g. and 5 ml., (6) 4.52 g. and 7 ml. Stirred well every 10 minutes as the styrene was grossly insoluble. Color disappearance and onset of opaqueness was very slow commencing after 30 minutes, but the time varied indirectly with the peroxide volume. Heat generation, degassing, and gelation were absent. The addition of three drops of the emulsifier, Tween 85, prior to styrene and peroxide addition in similar recipe preparations seemed to hasten the reaction somewhat but did not alter the final state of apparent scant reaction.

EXAMPLE 24

To 15 g. of an aqueous soluble starch xanthate solution containing 9.41% sodium starch xanthate (8.58% starch equivalent) of 0.16 D.S. added 2.71 g. of styrene and stirred well. Still stirring, added 5 ml. of 30% hydrogen peroxide. The reaction was very rapid, much as with acrylonitrile, color disappearance, gas formation, heat evolution, and white opaque gel formation commencing. Degassing was hard to judge though as the gel turned into a somewhat "balled" mass after about 5 minutes. Viscosity measurements were not obtainable. Upon setting overnight, the gel "broke" and the reaction mixture was a watery, white colloidal suspension. The addition of three drops of Tween 85 prior to styrene provided smoother manipulation in the gelling process.

Foam and Solid Rubber-Starch Graft Copolymer Production

EXAMPLE 25

To 50 ml. (49.92 g.) of NBR 236 latex (19.75 g. solids) added 15 g. of an aqueous soluble starch xanthate solution containing 10.29% sodium starch xanthate (9.54% starch equivalent) of 0.13 D.S. Stirred well to make a slightly thickened, orange, creamy consistency mixture (this mix is stable, without noticeable change, for at least 24 hours at room temperature). Rapidly stirred in a mixture of 7 ml. of 30% hydrogen peroxide and 5 ml. of acrylonitrile. This took about a minute and the mix was poured into a 250-ml. graduated cylinder. Disappearance of orange color, heat evolution, and degassing and foaming began in several minutes. After maximum foam volume gain was attained (57 ml., 78% gain in 180 minutes), which time was very soon after cessation of gas and heat evolution, the exuded liquid was decanted and its pH measured (28 ml., pH 7.0). This liquid was usually clouded with some latex solids, and perhaps unreacted monomer as it had a nitrile odor.

The solid mass was washed well with water, taking care not to squeeze or deform it. Its length and weight were measured from time to time as it sat at room temperature in a draft hood to dry to steady state (20.6 g., 10.29% N content dry basis). Die-cut portions of such solid pieces were suitable for compression set and rebound tests. Reaction mixtures of the same size recipe were cast in broad shallow trays or Petri dishes to get foam sheets of appropriate thickness when dry to provide die-cut dumbells for tensile, break, elongation, and tension set tests. Castings of multiple sizes of the recipe in large pans provided thick pads of the foam solids that were also suitable for compression and static fatigue tests. Tests were made as per ASTM methods (1968 Book of ASTM Standards, Part 28, pp. 198–205, 209–217, and 504–512, American Society for Testing and Materials, Philadelphia, Pa., 1968), with the results noted in Table 2.

TABLE 2

| Example No. | SX D.S. | Elastomer type | Starch:Elastomer, wt., % | Compression set Ch, % | | Elong. at break, % | Tension set, % | Load at break, kg. | Tensile strength | | Rebound % |
|---|---|---|---|---|---|---|---|---|---|---|---|
| | | | | 77° F | 158° F | | | | kg/cm² | lb/in² | |
| 25 | 0.13 | NBR 236 | 7.2 | | 52.9 | 460 | 30 | 0.80 | 4.45 | 63 | 16 |
| 26 | 0.15 | NBR 236 | 2.6 | 43.9 | 48.0 | 230 | 0 | 0.42 | 1.40 | 20 | 12 |
| 27 | 0.13 | NBR 251 | 3.9 | | | 420 | 6 | 1.25 | 7.10 | 101 | |
| 28 | 0.15 | NBR 251 | 2.4 | 43.7 | 50.0 | 422 | 6 | 0.35 | 1.00 | 14 | 48 |
| 29 | 0.13 | SBR 2105 | 4.0 | | | 240 | 6 | 0.30 | 1.50 | 22 | |
| 30 | 0.15 | SBR 2105 | 2.3 | 24.9 | 47.9 | 715 | 22 | 1.06 | 3.25 | 46 | 42 |
| 31 | 0.13 | PCP 571 | 7.2 | | | 710 | 18 | 1.35 | 6.00 | 85 | |
| 32 | 0.15 | PCP 571 | 2.2 | 30.5 | 43.5 | >870 | 75 | 1.23 | 7.75 | 110 | 18 |

This example has a correlation with Example 1 in grafting reaction parameter specification. Additional experimentation with AN and other xanthates in which systematic changes were made in the above recipe and which may be considered as part of this Example 25 gave rise to such observations as with a given D.S. and constant amounts of AN, peroxide, and latex increasing the amount of starch per 100 parts rubber over the range 3 to 9 progressively increases the foam volume gain but decreases the compression set and rebound percentages; yet these percentages then rise again at 10 parts starch; and, with a given D.S. and constant amounts of AN, peroxide, and latex, the addition of progressively increasing amounts of acid to the reaction mixture to promote a gradual decrease in the pH of the final foam from 7.0 to 6.6 and a concomitant slight gain in isolatable solid produces a gradual decrease in foam volume gain and an increase in exudate liquid volume but no change in the physical strength of the foam rubber solids (wet or dry) until a certain amount of acid has been added, whereafter the strength falls dramatically; and xanthates of about 0.25 D.S. and higher seem best suited for solid rubber-starch graft copolymer coprecipitation as they produce a meager foam volume increases.

EXAMPLE 26

This was done in the same manner as Example 25 using 100 ml. (99.84 g.) of the latex (39.5 g. solids), 10 g. of an aqueous soluble starch xanthate solution containing 10.64% sodium starch xanthate (9.75% starch equivalent) of 0.15 D.S. 14 ml. of hydrogen peroxide, and 10 ml. of AN to get a foam volume gain of 82 ml. (62%) in 52 minutes, 53 ml. of pH 6.9 exudate, and 37.9 g. of foam rubber solids with the strength properties noted in Table 2.

EXAMPLE 27

This was done in the same manner as Example 25 using 39 ml. (40 g.) of NBR 251 latex (24.60 g. solids), 10 g. of the xanthate solution, 8.7 ml. of hydrogen peroxide, and 6.2 ml. of AN to obtain 26.3 g. of foam rubber solids containing 6.88% nitrogen and having the strength properties noted in Table 2.

EXAMPLE 28

This was done in the same manner as Example 26 using 64 ml. (66 g.) of NBR 251 latex (40.59 g. solids) to get a foam volume gain of 108 ml. (96%), in 45 minutes, 30 ml. of pH 6.9 exudate, and 36.5 g. of foam rubber solids with the strength properties noted in Table 2.

EXAMPLE 29

This was done in the same manner as Example 27 using 42 ml. (40 g.) of SBR 2105 latex (23.80 g. solids) to obtain 20.3 g of foam rubber solids (a mechanical loss of yield occurred) containing 0.52% nitrogen and having the strength properties noted in Table 2.

EXAMPLE 30

This was done in the same manner as Example 26 using 67 ml. (71.7 g.) of SBR 2105 latex (42.66 g. solids) to get a foam volume gain of more than 155 ml. (>163%), in 15 minutes, 4 ml. of pH 7.3 exudate, and 32.2 g. of foam rubber solids with the strength properties noted in Table 2.

EXAMPLE 31

This was done in the same manner as Example 25 using 36 ml. (39.5 g.) of PCP 571 latex (19.75 g. solids) to obtain 20.0 g. of foam rubber solids having the strength properties noted in Table 2 and containing 0.34% nitrogen.

EXAMPLE 32

This was done in the same manner as Example 26 using 80 ml. (89.0 g.) of PCP 571 latex (44.50 g. solids) to get a foam volume gain of 105 ml. (88%) in 5 minutes, no exudate, and 50.2 g. of foam rubber solids with the strength characteristics given in Table 2.

EXAMPLE 33

This was done in the same manner as Example 26 using 62 ml. (62 g.) of PIP 700 latex (40.30 g. solids) to get an essentially nonfoaming coagulum that exuded about 10 ml. of pH 6.7 liquid. The coagulum had poor cohesive strength, failing to hold together.

EXAMPLE 34

This was done in the same manner as Example 26 using a Natural rubber latex and varying the amount of starch solids to rubber solids from 6 per 100 and varying the amounts of AN and 30% hydrogen peroxide appropriately to get foam volume gains of 260 to >300 ml. (320 to >480%) in 2–5 minutes. However, on standing longer these foams quickly recede to yield reduced volumes of tapioca-like pudding coagulates (the gas bubbles simulating the tapioca grains) that exude (5–30 ml. of liquid with 5.4–7.0 pH. The puddings were washed with water and dried to get fair yeilds of product of nondescript shapes. A comparable use of a 0.23 D.S. xanthate resulted in pH 3 exudate and an increased yield of dry solids indicative of about 80–85% AN polymerization.

EXAMPLE 35

To 317 ml. (336 g.) of SBR 2105 latex (200 g. solids) added 519 g. of an aqueous soluble starch xanthate solution containing 11.09% sodium starch xanthate (9.63% starch equivalent) of 0.25 D.S. Stirred well and added 160 ml. of AN and 225 ml. of 30% hydrogen peroxide. After the peroxide addition, a moderate foaming increased the volume 300–400 ml. The foam was broken up by stirring with a spatula and the broken curd left overnight at room temperature. About 120 ml. of pH 3 exudate was obtained. The curd was washed well with water. It was set to dry at room temperature in a draft hood, breaking up the curd mechanically as drying progessed. The curd was friable and yielded 362 g. of light cream-colored product containing 6.39% nitrogen, corresponding to 63% polymerization of the AN added.

The dry product was compounded with 10 g. zinc oxide, 4 g. sulfur, 3 g. stearic acid, 3 g. benzothiazole-2-thiol, and 2 g. octylated diphenylamine in the roller mill method of ASTM. Portions were press cured for 10 minutes for specimens for tensile strength tests and 15 minutes for specimens for other physical characterizations, all as per ASTM methods, with these results—compression set (158° F.) 50%, rebound 51%, Shore A hardness 65, elongation at break 422%, tensile strength 753 p.s.i., 300% modulus 689 p.s.i. For SBR 2105 compounded and processed in the same manner, but without starch or starch graft polymer addition, the strength values are—compression set 44%, rebound 58%, Shore A hardness 40, elongation at break 920%, tensile strength 405 p.s.i., 300% modulus 115 p.s.i.

EXAMPLE 36

To 50 ml. (48.0 g.) of SBR 2105 latex (28.56 g. solids) added 15 g. of an aqueous soluble starch xanthate solution containing 11.66% sodium starch xanthate (11.00% starch equivalent) of 0.10 D.S. and mixed well. Stirred in rapidly a mixture of 5.0 g. acrylamide in 5 ml. of water and 7 ml. of 30% hydrogen peroxide and poured into a 250-ml. graduate. The mixture began to degas and warm in several minutes and continued at a rather even rate. Maximum foam gain, 160 ml. or 210%, was reached in 20 minutes, but the foam was allowed to set overnight at room temperature. The exuded liquid was measured (5 ml. with 7.3 pH, fairly clear) and the core washed and set to dry as in Example 25. The ca. 12 cm. long foam cylinder shrunk to ca. 10 cm., 34.3 g., a tan, tough, hard, stiff material, more like a hard plastic foam rather than a foam rubber.

EXAMPLE 37

A reaction mixture was made in the same recipe as in Example 36, except that 5 ml. (5.31 g.) of acrylic acid was substituted for the 5 ml. aqueous acrylamide solution, and similarly processed. However, the reaction was nearly instantaneous and degassing, warming, and balling-up of solids were simultaneous. About 10 ml. of pH 2.9 liquid exuded from the ball. The dried ball, 31 g., had a surface of a variable softness.

EXAMPLE 38

A reaction mixture was made in the same recipe as in Example 36, except that 6.3 ml. (6.28 g.) of methyl acrylate was substituted for the 5 ml. aqueous acrylamide solution, and similarly processed, pouring into a graduated cylinder. Degassing and warming began in ca. 5 minutes and continued at lesser rate than did the amide-containing mix, maximum foam gain—75 ml. or 100% in 30 minutes. The exudate was ca. 5 ml., pH 6.7. The ca. 10 cm. long foam cylinder dried without shrinkage to a cream-colored, tough, hard, stiff material, 32.0 g., more plasticlike than rubberlike.

EXAMPLE 39

A reaction mixture was made in the same recipe as in Example 36, except that 5 ml. (4.21 g.) of acrolein was substituted for the 5 ml. aqueous acrylamide solution. The reaction was very rapid as in Example 37, coagula- tion of solids prevented pouring into a cylinder, but the solid coagulum did not ball up. About 5 ml. of water-white liquid exudate was obtained, pH 3.8. The brown, dry mass, 42.0 g., was compacted, but soft and rubbery.

EXAMPLE 40

To 50 ml. (48.0 g.) of SBR 2105 latex (28.56 g. solids) added 15 g. of an aqueous soluble starch xanthate solution containing 9.41% sodium starch xanthate (8.58% starch equivalent) of 0.16 D.S. and mixed well. Stirred in 3 ml. of styrene and 5 ml. of 30% hydrogen peroxide. In just several minutes the mix warmed and coagulated to a stiff mass that swelled with gas evolution in ca. 5 minutes. After overnight setting, ca. 5 ml. of pH 7.8 liquid had exuded. The washed and dried solid mass weighed 30.5 g. and had 47.4% compression set at 158° F. and 55% rebound.

EXAMPLE 41

To 52 ml. (51.92 g.) of NBR 236 latex (20.54 g. solids) added 15 g. of the same aqueous xanthate solution as in Example 40. Stirred well and stirred in 3 ml. of styrene and 5 ml. of 30% hydrogen peroxide. In several minutes the mix thickened a bit, then thinned, and in several more minutes began to slowly warm and degas. The volume expansion was not great enough to warrant measuring in a graduate. Appropriate castings were made to obtain physical testing specimens. After setting overnight, the solids were isolated (exudate ca. 5 ml., pH 7.5), washed, and dried —20.9 g., 51.1% compression set (158° F.), 305% elongation at break, 13.9% tension set, 0.66 kg. load at break, 3.27 kg./cm.$^2$ or 46.5 lb./in$^2$ at break tensile strengths.

EXAMPLE 42

This was the same as Example 41 except that the xanthate used was 15 g. of an aqueous soluble starch xanthate solution containing 11.17% sodium starch xanthate (10.41% starch equivalent) of 0.12 D.S. The dried solids obtained in appropriate casting forms were 23.4 g. —700% elongation at break 25.0% tension set, 0.69 kg. load at break, 5.49 kg./cm.$^2$ or 78.1 lb./in.$^2$ at break tensile strengths.

I claim:

1. A method of preparing starch graft copolymers comprising the following steps:
   a. Preparing an aqueous solution of an alkali metal salt of starch xanthate having a xanthate degree of subsitution of from 0.05 to 3, said aqueous solution having a pH of about 11;
   b. Reacting in said aqueous solution hydrogen peroxide and a vinyl monomer with said starch xanthate to form a gel of starch graft copolymer, said starch xanthate, hydrogen peroxide, and vinyl monomer being present in amounts such that the pH of the resulting reaction media drops to a value of from about 2 to 7;
   c. Recovering said starch graft copolymer.

2. A method as described in claim 1 from about 3 to ;b 100 moles of vinyl monomer and from about 5 to 170 moles of hydrogen peroxide are reacted per mole of xanthate groups present in the aqueous solution, and wherein the starch xanthate has a xanthate degree of substitution of from about 0.1 to 0.6.

3. A method as described in claim 1 wherein the starch graft copolymer is recovered by washing the gel described in step (b) in a suitable solvent and drying the resulting solid starch graft copolymer, said solid starch graft copolymer containing from 10% to 98% by weight of the polymerized added vinyl monomer and from 0% to 60% by weight of the sulfur contained in the added starch xanthate.

4. A method as described in claim 1 wherein the vinyl monomer is acrylonitrile, acrylic acid, acrylamide, methyl acrylate, acrolein, or styrene.

5. A method as described in claim 2 wherein the vinyl monomer is acrylonitrile, acrylic acid, acrylamide, methyl acrylate, acrolein, or styrene.

6. A method as described in claim 3 wherein the vinyl monomer is acrylonitrile, acrylic acid, acrylamide, methyl acrylate, acrolein, or styrene.

7. The product prepared by the method described in claim 1.

8. The product prepared by the method described in claim 2.

9. The product prepared by the method described in claim 3.

10. The product prepared by the method described in claim 4.

11. The product prepared by the method described in claim 5.

12. The product prepared by the method described in claim 6.

13. A method of preparing rubber compositions comprising the following steps:
   a. Preparing an aqueous solution of an alkali metal salt of starch xanthate having a xanthate degree of substitution of from 0.05 to 3, said aqueous solution having a pH of about 11;
   b. Mixing thoroughly the aqueous solution described in step (a) with a suitable aqueous rubber latex;
   c. Reacting the components of the mixture described in step (b) with hydrogen peroxide and a vinyl monomer, said starch xanthate, vinyl monomer, hydrogen peroxide and rubber latex being present in amounts such that the pH of the resulting reaction mixture drops below the gel point of the rubber latex.

14. A method as described in claim 13 wherein from about 0.1 to about 1.0 moles of vinyl monomer, from about 0.1 to about 1.0 moles of hydrogen peroxide, and an amount of starch xanthate containing from about 0.001 to about 0.04 moles of xanthane groups were reacted in the presence of about 100 g. of aqueous rubber latex solids, said starch xanthate having a xanthate degree of substitution of from about 0.1 to about 0.5.

15. A method of preparing solid rubber compositions as described in claim 13 wherein the reaction mixture described in step (c) is stirred during the reaction thereby preventing a foamed coagulum formation and resulting in a washable curd.

16. A method as described in claim 13 wherein the starch xanthate has a degree of substitution of from 0.1 to 0.25.

17. A method as described in claim 15 wherein the starch xanthate has a xanthate degree of subsitution of about 0.25.

18. A method as described in claim 13 wherein the vinyl monomer is acrylonitrile, acrylic acid, acrylamide, methyl acrylate, acrolein, or styrene.

19. A method as described in claim 14 wherein the vinyl monomer is acrylonitrile, acrylic acid, acylamide, methyl acrylate, acrolein, or styrene.

20. A method as described in claim 15 wherein the vinyl monomer is acrylonitrile, acrylic acid, acrylamide, methyl acrylate, acrolein, or styrene.

21. A method as described in claim 16 wherein the vinyl monomer is acrylonitrile, acrylic acid, acrylamide, methyl acrylate, acrolein, or styrene.

22. A method as described in claim 17 wherein the vinyl monomer is acrylonitrile, acrylic acid, acrylamide, methyl acrylate, acrolein, or styrene.

23. The product prepared by the method described in claim 13.

24. The product prepared by the method described in claim 14.

25. The product prepared by the method described in claim 15.

26. The product prepared by the method described in claim 16.

27. The product prepared by the method described in claim 17.

28. The product prepared by the method described in claim 18.

29. The product prepared by the method described in claim 19.

30. The product prepared by the method described in claim 20.

31. The product prepared by the method described in claim 21.

32. The product prepared by the method described in claim 22.

* * * * *

UNITED STATES PATENT OFFICE
CERTIFICATE OF CORRECTION

Patent No. 4,005,040                              Dated   January 25, 1976

Inventor(s)   George G. Maher

It is certified that error appears in the above-identified patent and that said Letters Patent are hereby corrected as shown below:

Col. 1, line 44, cancel "An" and insert -- AN -- ;
       line 50, cancel "ph" and insert -- pH -- ;
       line 67, cancel "ıı\" and insert -- $\sqrt{\phantom{x}}$ -- .
Col. 2, line 22, cancel "U.s." and insert -- U.S. -- .
Col. 3, line 11, cancel "intant" and insert -- instant -- ;
       line 13, cancel "ahd" and insert -- and -- ;
       line 39, after "of" insert -- and --.
       line 58, cancel "Ny" and insert -- My -- .
Col. 4, line 39, cancel "inncorporated" and insert -- incorporated -- .
Col. 6, line 31, cancel "comtemplated" and insert -- contemplated -- .
Col. 7, line 20, cancel "disulfied" and insert -- disulfide -- .
Col. 9, line 15, cancel "D.s." and insert -- D.S. -- .
Col. 10, line 12, cancel "vary" and insert -- very -- .
Col. 17, line 59, after "claim 1" insert -- wherein -- ;
       line 60, cancel ";b" .

Signed and Sealed this

Thirty-first Day of May 1977

[SEAL]

Attest:

RUTH C. MASON  
Attesting Officer

C. MARSHALL DANN  
Commissioner of Patents and Trademarks

UNITED STATES PATENT OFFICE
CERTIFICATE OF CORRECTION

Patent No. 4,005,040  Dated January 25, 1977

Inventor(s) George G. Maher

It is certified that error appears in the above-identified patent and that said Letters Patent are hereby corrected as shown below:

Col. 1, line 44, cancel "An" and insert -- AN -- ;
      line 50, cancel "ph" and insert -- pH -- ;
      line 67, cancel "↑" and insert -- / -- .
Col. 2, line 22, cancel "U.s." and insert -- U.S. -- .
Col. 3, line 11, cancel "intant" and insert -- instant -- ;
      line 13, cancel "ahd" and insert -- and -- ;
      line 39, after "of" insert -- and -- ;
      line 58, cancel "Ny" and insert -- My -- .
Col. 4, line 39, cancel "inncorporated" and insert -- incorporated -- .

Col. 7, line 20, cancel "disulfied" and insert -- disulfide -- .
Col. 9, line 15, cancel "D.s." and insert -- D.S. -- .
Col. 10, line 12, cancel "vary" and insert -- very -- .
Col. 17, line 59, after "claim 1" insert -- wherein -- ;
      line 60, cancel ";b" .

This certificate supersedes Certificate of Correction issued May 31, 1977.

Signed and Sealed this

Twenty-seventh Day of September 1977

[SEAL]

Attest:

RUTH C. MASON  
Attesting Officer

LUTRELLE F. PARKER  
Acting Commissioner of Patents and Trademarks